US012030746B2

(12) United States Patent
Shum

(10) Patent No.: US 12,030,746 B2
(45) Date of Patent: Jul. 9, 2024

(54) STAIR ASSISTANCE DEVICE AND SYSTEM

(71) Applicant: Ricky Shum, Los Angles, CA (US)

(72) Inventor: Ricky Shum, Los Angles, CA (US)

( * ) Notice: Subject to any disclaimer, the term of this patent is extended or adjusted under 35 U.S.C. 154(b) by 0 days.

(21) Appl. No.: 18/169,586

(22) Filed: Feb. 15, 2023

(65) Prior Publication Data

US 2023/0257232 A1 Aug. 17, 2023

Related U.S. Application Data

(60) Provisional application No. 63/310,879, filed on Feb. 16, 2022.

(51) Int. Cl.
*B66B 9/08* (2006.01)

(52) U.S. Cl.
CPC .......... *B66B 9/0869* (2013.01); *B66B 9/0853* (2013.01)

(58) Field of Classification Search
CPC ............................ B66B 9/0853; B66B 9/0869
See application file for complete search history.

(56) References Cited

U.S. PATENT DOCUMENTS 4,100,995 A 7/1978 Pradon
4,457,402 A * 7/1984 Del Vecchio ......... B66B 9/0869 105/449
5,291,971 A 3/1994 Bovis
5,802,773 A * 9/1998 Pingel .................. B66B 9/0869 52/10
7,234,565 B1 6/2007 Lam
7,296,659 B2 11/2007 Carlsen
7,484,595 B2 2/2009 Schroeder et al.
7,699,328 B2 4/2010 Crawford
10,227,211 B2 3/2019 Lyons et al.
11,104,548 B2 * 8/2021 Teglia .................. B66B 9/0869
2021/0061617 A1 * 3/2021 Lupher ................. B66B 9/0869

FOREIGN PATENT DOCUMENTS

WO WO-2004022472 A1 * 3/2004 ............. B66B 21/02
WO WO-2018217843 A1 * 11/2018 ............ E04F 11/104

* cited by examiner

*Primary Examiner* — Diem M Tran
(74) *Attorney, Agent, or Firm* — Boudwin Intellectual Property Law, LLC; Daniel Boudwin

(57) ABSTRACT

A stair assistance device and a system for assisting individuals with traversing stairways is provided. Each stair assistance device includes a platform. The platform has a first end that is defined opposite of a second end. Each end has an interface. Each interface is designed to secure the end of the platform to one of a pair of lifts. The lifts are designed to vertically displace the platform from a raised position to a lowered position and vice versa. Multiple stair assistance devices may be used to assist an individual with traversing an entire stairway.

8 Claims, 3 Drawing Sheets

STAIR ASSISTANCE DEVICE AND SYSTEM

CROSS REFERENCE TO RELATED APPLICATIONS

This application claims the benefit of U.S. Provisional Application No. 63/310,879 filed on Feb. 16, 2022. The above identified patent application is herein incorporated by reference in its entirety to provide continuity of disclosure.

BACKGROUND OF THE INVENTION

The present invention relates to a stair assistance device and system. More specifically, the present invention provides one or more liftable platforms to assist individuals with traversing stairways.

Many people with mobility issues struggle to go up and down stairs. Often, individuals with knee problems or other mobility problems that do not result in the use of a wheelchair, will particularly struggle with stairs as they typically do not have access to special stair lifts or similar devices. Furthermore, most current devices are not tailored to the exact case of stairs on which they are installed. Therefore, there is a need for a system that will assist individuals with mobility issues in ascending and descending stairways.

SUMMARY OF THE INVENTION

In view of the foregoing disadvantages inherent in the known types of stairway assistance devices and methods now present in the prior art, the present invention provides a stair assistance device and system wherein the same can be utilized for providing convenience for the user when assisting individuals with traversing stairways.

The present system comprises a platform. The platform defines a first end opposite a second end. The first end of the platform defines a first interface. The first interface is configured to engage a first lift. The second end of the platform defines a second interface. The second interface is configured to engage a second lift. The first lift and the second lift are configured to vertically displace the platform from a raised position to a lowered position, and from a lowered position to a raised position. One or more stair assistance devices may be utilized in conjunction with one another such that a system to traverse an entire stairway can be provided.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
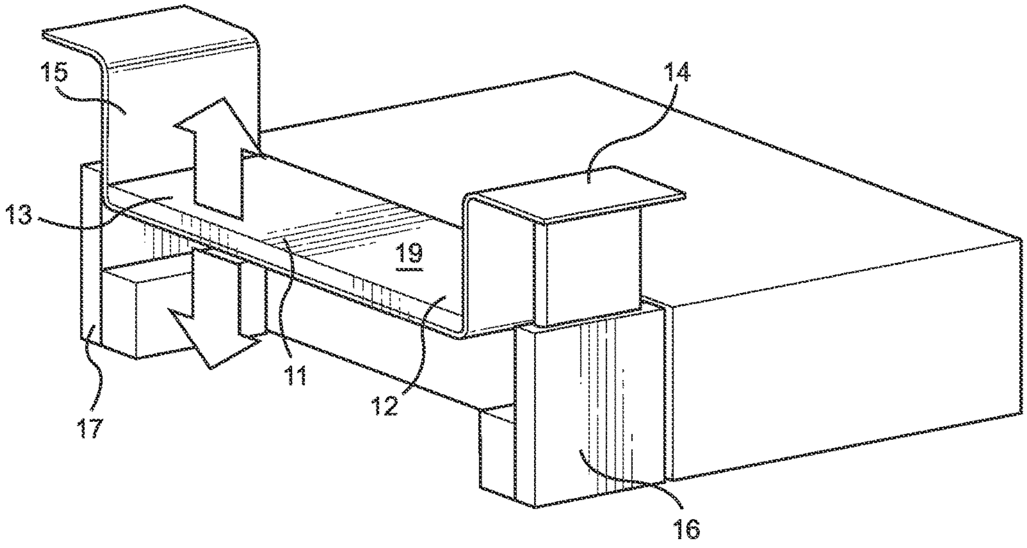
FIG. 1 shows a perspective view of an embodiment of the stair assistance device.

Reference is made herein to the attached drawings. Like reference numerals are used throughout the drawings to depict like or similar elements of the stair assistance device and system for assisting individuals with traversing stairways. The figures are intended for representative purposes only and should not be considered to be limiting in any respect.

Referring now to FIG. 1, there is shown a perspective view of an embodiment of the stair assistance device. The stair assistance device 10 comprises a platform 11. The platform 11 defines a first end 12 opposite a second end 13. In the illustrated embodiment, the platform 11 is rectangular in shape, such as to be placed over a traditional stair of a stairway. Furthermore, in the illustrated embodiment, the platform 11 comprises an upper surface 19 that is entirely flat. As such, the platform 11 will provide a stable area on which a user may step.

The first end 12 of the platform 11 comprises a first interface 14. The first interface 14 is configured to engage a first lift 16. The first lift 16 comprises a motor, such that force may be applied to the first end 12 of the platform 11 via the first interface 14. The motor is internally disposed within the housing of the first lift 16 and may be of any suitable configuration for applying bidirectional force to the first end 12 of the platform 11.

The second end 13 of the platform 11 comprises a second interface 15. The second interface 15 is configured to engage a second lift 17. The second lift 17 comprises a motor, such that force may be applied to the second end 13 of the platform 11 via the second interface 15. The motor is internally disposed within the housing of the second lift 17 and may be of any suitable configuration for applying bidirectional force to the second end 13 of the platform 11.

Figure 2:
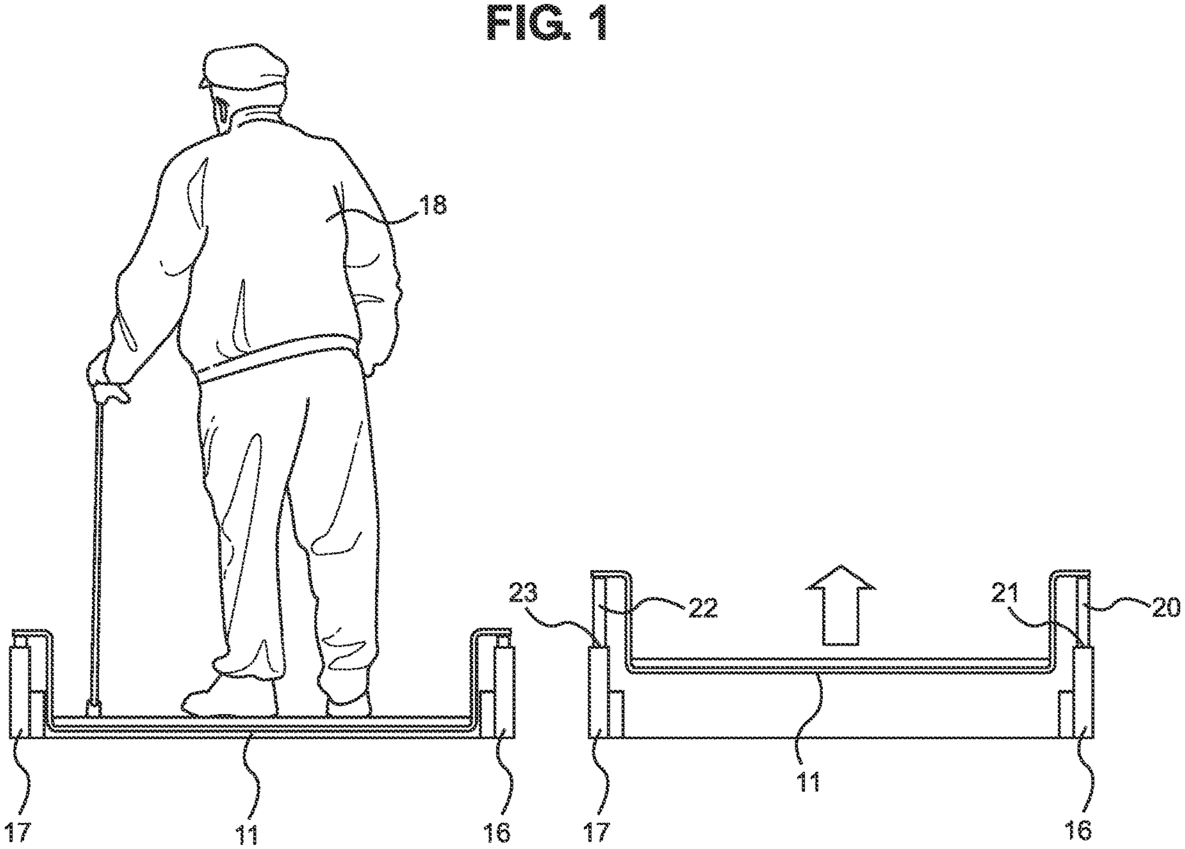
FIG. 2 shows a demonstrative view of an embodiment of the stair assistance device.

Referring now to FIG. 2, there is shown a demonstrative view of an embodiment of the stair assistance device. When the first lift 16 and the second lift 17 are engaged, the platform 11 can be moved from a raised position (shown in FIG. 1 and on the right in FIG. 2) to a lowered position (shown in FIG. 5 and on the left in FIG. 2), and from a lowered position to a raised position. As such, an individual 18 who is handicapped or has mobility issues will be able to be elevated upward and downward to assist with traversing a stair. The raised position is defined where the platform 11 is disposed at the top portions of each of the first lift 16 and the second lift 17. The lowered position is defined where the platform 11 is disposed at the bottom portions of each of the first lift 16 and the second lift 17.

In some embodiments, the motors of the first lift 16 and the second lift 17 are in operable connection with at least one sensor. As such, the sensor, or sensors, will be configured to move the platform 11 from a raised position to a lowered position, or from a lowered position to a raised position when the presence of an individual 18 is detected upon the platform 11. The sensor may be of any suitable configuration for detecting the presence of an individual, such as a weight sensor or an infrared sensor.

In the illustrated embodiment, the first interface comprises a first vertical support 20. The first vertical support 20 is configured to engage a first aperture 21 disposed on the top surface of the first lift 16. Additionally, in the illustrated embodiment, the second interface comprises a second vertical support 22. The second vertical support 20 is configured to engage a second aperture 23 disposed on the top surface of the second lift 17. As such, the first lift 16 and the second lift 17 will raise and lower the platform 11 by elevating and lowering the first vertical support 20 and the second vertical support 22 in and out of the first lift 16 and the second lift 17 via the first aperture 21 and the second aperture 23.

Figure 4:
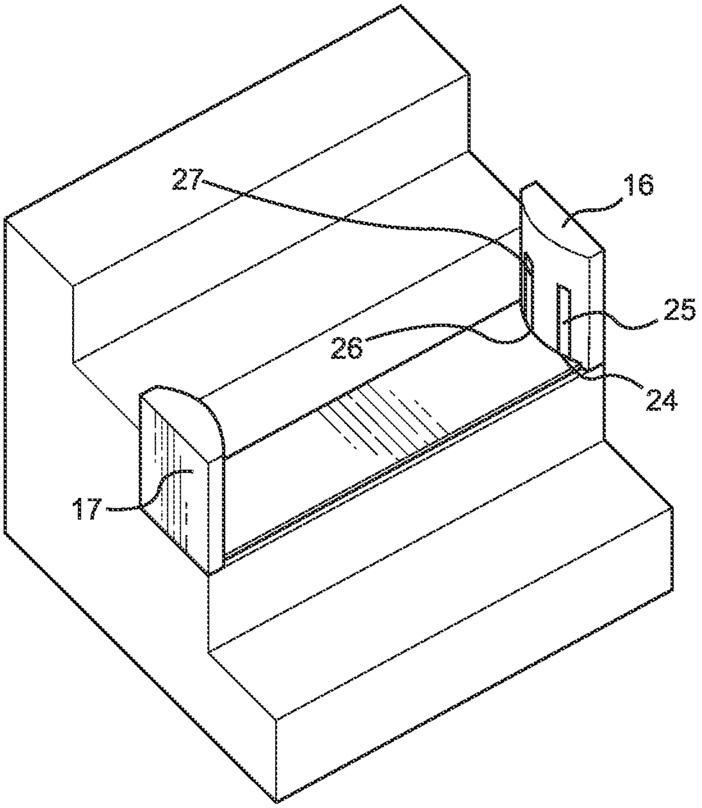
FIG. 4 shows a perspective view of an embodiment of the stair assistance device.

Referring now to FIG. 4, there is shown a perspective view of an embodiment of the stair assistance device. In the illustrated embodiment, the first interface comprises a first protrusion 24. The first protrusion 24 is configured to engage a first slot 25 of an inside surface of the first lift 16. Furthermore, in the illustrated embodiment, the first interface comprises a second protrusion 26. The second protrusion 26 is configured to engage a second slot 27 of the inside surface of the first lift 16. As such, the protrusions 24, 26 may be elevated or lowered by the action of the first lift 16.

Similarly, in the illustrated embodiment, the second interface comprises a first protrusion. The first protrusion is configured to engage a first slot of an inside surface of the second lift 17. Furthermore, in the illustrated embodiment, the second interface comprises a second protrusion. The second protrusion is configured to engage a second slot of the inside surface of the second lift 17. As such, the protrusions may be elevated or lowered by the action of the second lift 17.

Figure 3:
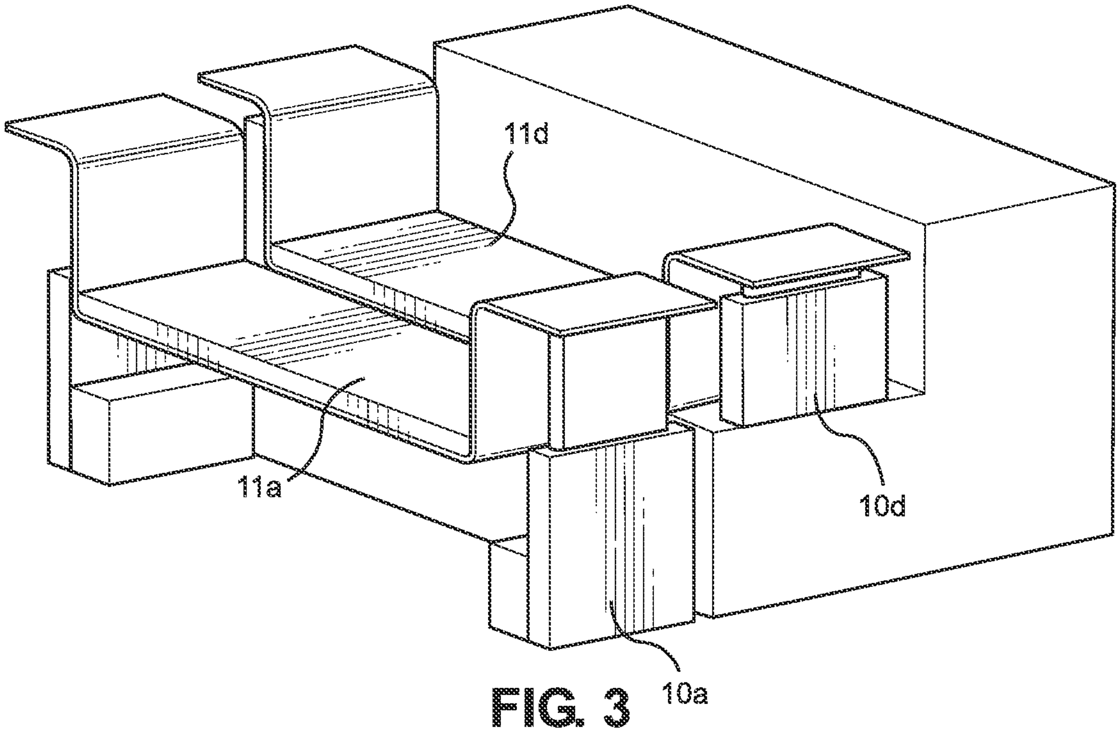
FIG. 3 shows a perspective view of an embodiment of the system for assisting individuals with traversing stairways.

Referring now to FIG. 3, there is shown a perspective view of an embodiment of the system for assisting individuals with traversing stairways. Two or more stair assistance devices 10*a*, 10*d* may be utilized in conjunction with each other to traverse a stairway or a set of stairs. In the illustrated embodiment, two stair assistance devices consisting of a base stair assistance device 10*a* and a park stair assistance device 10*d* are utilized to assist an individual with traversing a stairway. The base stair assistance device 10*a* is dimensioned such that the platform 11*a*, when in the raised position, will be even with the platform 11*d* of the peak stair assistance device 10*d* when the peak stair assistance device 10*d* is in the lowered position. As such, whenever the individual is elevated or lowered by one platform, they will be able to step upon another platform that is presented at an even level.

Figure 5:
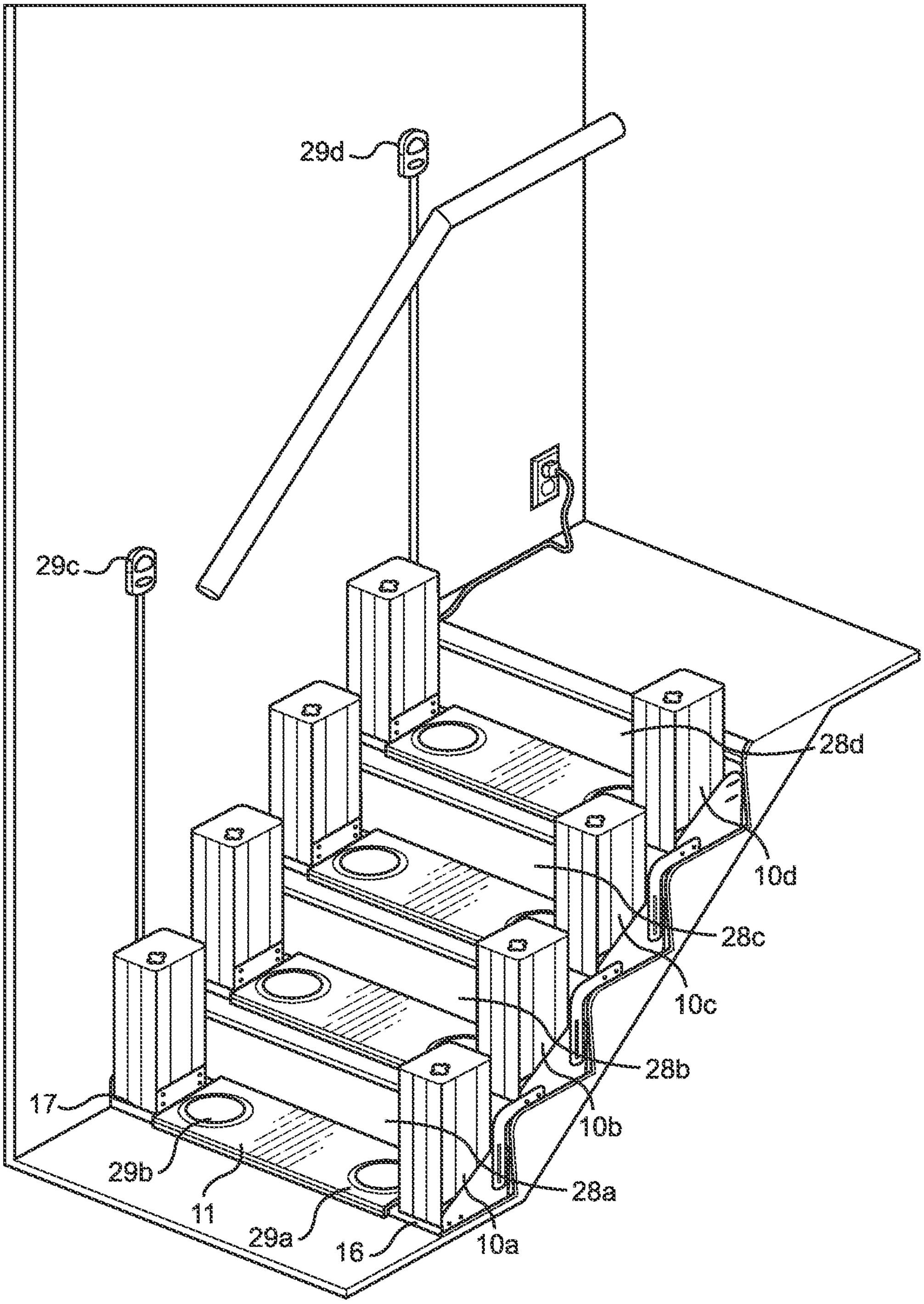
FIG. 5 shows a perspective view of an embodiment of the system for assisting individuals with traversing stairways.

Referring now to FIG. 5, there is shown a perspective view of an embodiment of the system for assisting individuals with traversing stairways. In the illustrated embodiment, four stair assistance devices 10*a*, 10*b*, 10*c*, 10*d* are utilized to traverse four linearly aligned stairs. The two or more stair assistance devices 10*a*, 10*b*, 10*c*, 10*d*, comprises at least a base stair assistance device 10*a* and a peak stair assistance device 10*d*. The base stair assistance device 10*a* is placed in the area adjacent to the first stair 28*a* of the stairway. The peak stair assistance device 10*d* is placed in the area adjacent to the highest stair 28*d* of the stairway. In the illustrated embodiment, a pair of intermediate stair assistance devices 10*b*, 10*c* are disposed between the base stair assistance device 10*a* and the peak stair assistance device 10*d*. When installing the system upon a stairway, it is preferable that each stair of the stairway includes a stair assistance device 10.

In some embodiments, each platform 11 of each stair assistance device comprises at least one aperture 29*a*, 29*b*, 29*c*. The aperture 29*a*, 29*b*, 29*c* is configured to move the platform 11 from a raised position to a lowered position and from a lowered position to a raised position. As such, the user will be able to manually control the position of the platform of each stair assistance device while using the system for assisting individuals with traversing stairways.

In some embodiments, the at least one actuator comprises one or more footpads 29*a*, 29*b*. The footpads 29*a*, 29*b* are disposed on the top surface of the platform 11. As such, the user may step on a footpad 29*a*, 29*b* to move the platform 11 from a raised position to a lowered position and from a lowered position to a raised position. In the illustrated embodiment, a pair of footpads 29*a*, 29*b* consisting of a first footpad 29*a* and a second footpads 29*b* are disposed on the platform 11. The first footpad 29*a* is disposed proximal to the first lift 16.

In other embodiments, the at least one actuator comprises one or more wall actuators 29*c*, 29*d*. The wall actuators 29*c*, 29*d* are placed on a wall adjacent to the stairway on which the system for assisting individuals with traversing stairways is installed. As such, the user will be able to press the wall actuator 29*c*, 29*d* to raise or lower the platform 11 of the corresponding stair assistance device to which it is operably connected. In the illustrated embodiment, the system for assisting individuals with traversing stairways comprises both wall actuators 29*b*, 29*c* and footpads 29*a*, 29*b*. As such, the user will have even greater control over the system for assisting individuals with traversing stairways.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A stair assistance device, comprising:

a platform;

the platform defining a first end opposite a second end;

the first end of the platform defining a first interface;

the first interface to engage a first lift;

the second end of the platform defining a second interface;

the second interface to engage a second lift; and wherein the first lift and the second lift vertically displace the platform between a raised position and a lowered position;

wherein the first lift comprises a first motor, such that force is directly applied to the first end of the platform via the first interface;

wherein the first motor is internally disposed within the housing of the first lift and directly applies bidirectional force to the first end of the platform;

wherein the second lift comprises a second motor, such that force is directly applied to the second end of the platform via the second interface;

wherein the second motor is internally disposed within the housing of the second lift and directly applies bidirectional force to the second end of the platform;

wherein the first interface comprises a first vertical support to directly engage a first aperture at a top surface of the first lift and the second interface comprises a second vertical support to directly engage a second aperture at a top surface of the second lift;

wherein the first interface comprises a first protrusion to directly engage a first slot on an inside surface of the first lift and the second interface comprises a second protrusion to directly engage a second slot on an inside surface of the second lift;

wherein the platform comprises at least one actuator to directly move the platform from the raised position to the lowered position and from the lowered position to the raised position; and wherein the at least one actuator is a footpad disposed on a top surface of the platform.

2. The stair assistance device of claim 1, wherein the platform is rectangular in shape.

3. The stair assistance device of claim 1, wherein the platform comprises an upper surface that is entirely flat.

4. The stair assistance device of claim 1, wherein the at least one actuator is a wall-mounted actuator.

5. A system for assisting individuals with traversing a stairway, comprising:

a plurality of stair assistance devices;

wherein each of the stair assistance devices comprises:

a platform, the platform defining a first end opposite a second end;

the first end of the platform defining a first interface;

the first interface to engage a first lift;

the second end of the platform defining a second interface;

the second interface to engage a second lift;

wherein the first lift and the second lift vertically displace the platform between a raised position and a lowered position;

wherein the plurality of stair assistance devices comprise a base stair assistance device and a peak assistance device;

wherein each of the stair assistance devices is adapted to be installed at an area adjacent to a stair;

wherein the first lift comprises a first motor, such that force is directly applied to the first end of the platform via the first interface;

wherein the first motor is internally disposed within the housing of the first lift and directly applies bidirectional force to the first end of the platform;

wherein the second lift comprises a second motor, such that force is directly applied to the second end of the platform via the second interface;

wherein the second motor is internally disposed within the housing of the second lift and directly applies bidirectional force to the second end of the platform;

wherein each end of the platform comprises at least one actuator configured to directly move the end of the platform from the raised position to the lowered position and from the lowered position to the raised position; and wherein the at least one actuator is a footpad disposed on a top surface of the platform.

6. The system for assisting individuals with traversing a stairway of claim 5, wherein each end of the platform is rectangular in shape.

7. The system for assisting individuals with traversing a stairway of claim 5, wherein each end of the platform comprises an upper surface that is entirely flat.

8. The system for assisting individuals with traversing a stairway of claim 5, wherein the at least one actuator is a wall-mounted actuator.

* * * * *